US010901820B1

(12) United States Patent
LePera et al.

(10) Patent No.: US 10,901,820 B1
(45) Date of Patent: Jan. 26, 2021

(54) ERROR STATE MESSAGE MANAGEMENT

(71) Applicant: International Business Machines Corporation, Armonk, NY (US)

(72) Inventors: William P. LePera, Wappingers Falls, NY (US); Sameh Sherif Sharkawi, Cypress, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/735,999

(22) Filed: Jan. 7, 2020

(51) Int. Cl.
*G06F 9/54* (2006.01)
*G06F 9/48* (2006.01)

(52) U.S. Cl.
CPC ............ *G06F 9/546* (2013.01); *G06F 9/4881* (2013.01)

(58) Field of Classification Search
None
See application file for complete search history.

(56) References Cited

U.S. PATENT DOCUMENTS

| 6,877,107 | B2 | 4/2005 | Giotta et al. |
| 7,536,591 | B2 | 5/2009 | Varadarajan et al. |
| 9,634,951 | B1 | 4/2017 | Hunt et al. |

OTHER PUBLICATIONS

Krammer et al., A generic dependability layer for building automation networks, 2016 IEEE World Conference on Factory Communication Systems (WFCS), 2016.
Koop et al., Can Software Reliability Outperform Hardware Reliability on High Performance Interconnects? A Case Study with MPI over InfiniBand, Proceedings of the 22nd annual international conference on Supercomputing, 2008.

*Primary Examiner* — Shih-Wei Kraft
(74) *Attorney, Agent, or Firm* — Garg Law Firm, PLLC; Rakesh Garg; David Quinn (57) ABSTRACT

An embodiment includes sending, via a queue pair (QP) at a first endpoint, a message to a second endpoint. The embodiment also includes detecting an error state of the QP caused by a failure at a third endpoint that automatically halts messages via the QP. The embodiment includes determining that communication between the first and second endpoints via the QP is viable, and placing messages to the second endpoint in a separate queue from messages to an unreachable endpoint. The embodiment also includes re-establishing communications between the first and second endpoints via the QP, and polling the second endpoint for an indication of a delivered message. Any messages indicated as having already been delivered are removed from the queue before re-starting communications with the second endpoint.

14 Claims, 5 Drawing Sheets

ERROR STATE MESSAGE MANAGEMENT

GOVERNMENT RIGHTS

This invention was made with Government support under B604134 awarded by ASC (Advance Simulation and Computing). The Government has certain rights in this invention.

TECHNICAL FIELD

The present invention relates generally to a method, system, and computer program product for I/O network messaging management. More particularly, the present invention relates to a method, system, and computer program product for error state message management.

BACKGROUND

Input/Output (I/O) networks, such as system buses, are used by a processor to communicate with peripherals, such as network adapters. However, constraints in the architectures of common I/O networks, such as the Peripheral Component Interface (PCI) bus, limit the overall performance of computers. As a result, new types of I/O networks have been introduced.

One type of I/O network is known and referred to as the InfiniBand network, hereinafter IB (Infiniband is a trademark of System I/O Inc., DBA Infiniband Trade Association in the United States and/or other countries). IB is an I/O architecture and specification for transmission of data between processors and I/O devices. Instead of sending data in parallel, which is the structure for sending data in PCI, IB send data in serial and can carry multiple channels of data at the same time in a multiplexing signal. The IB network replaces the PCI or other bus currently found in computers with a packet-switched network, complete with zero or more routers.

IB dynamically connected (DC) transport is an example of a type of IB data transmission. One server running even a single process can host a DC initiator (DCI) that sends messages via a queue pair (QP) to plural responder processes running on one or more other servers. The responder processes each hosts a respective DC target (DCT) module that receives the messages and responds with acknowledgement messages confirming receipt. In IB, the DCI maintains the QP messaging connections as long as there are messages to send to responder processes and the responder processes continue to acknowledge receipt of the messages.

SUMMARY

The illustrative embodiments provide for error state message management. An embodiment includes sending, via a queue pair (QP) at a first endpoint, a message to a second endpoint, wherein the first endpoint is associated with an initiator process running on a first node on a network and the second endpoint is associated with a responder process running on a second node on the network. The embodiment also includes detecting an error state of the QP caused by a failure at a third endpoint, the error state causing the QP to automatically halt sending messages to the second and third endpoints. The embodiment also includes determining that communication between the first and second endpoints is available via the QP. The embodiment also includes separating a first queued message that is queued to send to the third endpoint into a first queue and a second queued message that is queued to send to the second endpoint into a second queue. The embodiment also includes wherein the second queue comprises a list of key values and a table that includes the key values and associated message contents. The embodiment also includes re-establishing communications between the first and second endpoints via the QP. The embodiment also includes polling, responsive to the re-establishing of the communications, the second endpoint for an indication of a delivered message. The embodiment also includes deleting message content associated with the delivered message from the hash table. The embodiment also includes recommencing sending messages in the second queue to the second endpoint in order according to the first-in first-out (FIFO) list. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

In High Performance Computing, IB Direct Connect (DC) Transport allows a DC queue pair (QP) from a sender to service several destination endpoints. One type of error that occurs is a connection error, which indicates that the connection between the sender and an endpoint has been interrupted, leaving the endpoint unreachable from the sender. When a connection error occurs on a QP that is connected to several target processes, it is usually because of only one connection failure among the several connections. Because of this, some IB systems compare the list of messages in the send queue at the time of the error to determine whether any are intended for channels that are still viable. If so, the viable channels are re-established and the messages are sent. However, there is a risk in this situation of a same message being sent twice, which is problematic.

A connection fault can occur at any time, including moments between when a target process receives a message and when it sends an acknowledgement. In that scenario, the target process is not able to send the acknowledgement to the sender because the error already closed the connection. Since a sending network interface controller (NIC) did not receive an acknowledgement, the message remains in the send queue of the initiator NIC and it is flushed with other unsent messages. A problem occurs when the QP is recovered so that the flushed messages can be re-sent to their destinations. There can be times when, once the QP recovers a connection with an endpoint, even if that endpoint then sends an acknowledgement for a flushed message, the originator will still attempt to re-send that message with other flushed messages being re-sent. Under this scenario, the same message will be delivered twice to the destination endpoint, and acknowledged twice to the originator.

Even if the recipient detects the duplicate message, there remains a problem on the sender's side: the sender will still resend the message, and the IB drivers on the receiver will acknowledge it, even if it's upper-layer protocols will eventually discard the message for being a duplicate. The sender will see two successful completion events for the same message. This can be an issue if the sender uses the successful completion events to signal message cleanup actions, for example freeing a memory buffer twice, which could cause a number of problems. For example, it is possible that after the memory was freed the first time that the operating system reallocates the memory, so the second time the cleanup action is freeing memory that it does not own, which could trigger an error, or in C-library in Linux the result can be a "double free" error that leads to program crashes and stack traces that can affect the operation of the system.

The illustrative embodiments used to describe the invention generally address and solve the above-described problem of sending duplicate IB QP messages. The term "message" and variations thereof, as used herein, generally refers to any electronic communication using an IB architecture or other such architecture that permits direct access to a NIC straight from application space, and an ability for applications to exchange data directly between their respective virtual buffers across a network, all without involving the operating system directly in the address translation and networking processes. Also, an "error state" as used herein refers to a status or condition of a system, network, or the like upon the occurrence of an error and after the error for a period of time during which a process or processes are performed for recovering from the error.

In an embodiment, an error state message management process detects a connection error and, responsive to the error, evaluates whether any remaining messages in the initiating NIC's send queue are intended for processes that are still reachable. If so, then the process re-establishes the queue-pair connections with the reachable target processes. Once the QP connection is established, but before sending any of the messages in the sending queue, the process polls the re-connected target processes for message acknowledgements. If any are found, the process removes the message content of any queued messages that correspond to any detected message acknowledgements to prevent duplicate messages from being sent. Once those messages are processed, the process allows the messaging service to continue with the queued messages.

An embodiment includes sending, via a queue pair (QP), a message from an initiator process to a first responder process. An embodiment includes an initiator NIC that detects an error state of the QP caused by a failure at a second responder process. The error state causes the loss of the QP connections with both the first and second responder processes. In an embodiment, the initiator NIC determines that the connection with the first responder process is still viable. In an embodiment, the initiator NIC separates messages flushed from the send queue that are intended to be sent to the first responder process and assigns each message a unique identifier. In an embodiment, the unique identifiers are listed in a FIFO table in the order they should be sent. The unique identifiers are keyed to a hash table that includes the key values and associated message contents. In an embodiment, the NIC re-establishes the viable connection, and then polls the re-connected first responder process for message acknowledgements. If any are found, the NIC process removes the message content of any queued messages that correspond to any detected message acknowledgements to prevent duplicate messages from being sent. Once those messages are processed, the process allows the messaging service to continue with the queued messages.

An embodiment includes determining that communication between the first and second endpoints via the QP is viable. The embodiment also includes separating messages queued to send to the third endpoint into a first queue and messages queued to send to the second endpoint into a second queue, wherein the second queue comprises a list of key values and a table that includes the key values and associated message contents. The embodiment also includes re-establishing communications between the first and second endpoints via the QP. The embodiment also includes polling, responsive to the re-establishing of the communications, the second endpoint for an indication of a delivered message. The embodiment also includes deleting message content associated with the delivered message from the hash table. The embodiment also includes recommencing sending messages in the second queue to the second endpoint in order according to the FIFO list. Other embodiments of this aspect include corresponding computer systems, apparatus, and computer programs recorded on one or more computer storage devices, each configured to perform the actions of the embodiment.

In an embodiment, a network configuration supports an IB DC transport service amongst a plurality of nodes. In an embodiment, the nodes are interconnected by a network, for example a packet network, such as an IB switch fabric. In an embodiment, a first node is a server that acts as an initiator node, and the remaining nodes act as responder nodes. However, in an embodiment, any of nodes can act as an initiator, a responder, or both concurrently at various times.

In an embodiment, an initiator process runs on a server that connects to a network via a NIC (such as an IB Host Channel Adapter (HCA)). In an embodiment, the NIC receives a work request from the initiator process to send a message to a responder process at another endpoint. In an embodiment, responsive to receiving the work request, the NIC of the initiator node sends a "DC Connect" packet to a responder NIC associated with the responder process. In an embodiment, after sending the DC connect packet, the initiator NIC waits to receive an acknowledgment from the responder NIC, and, if the acknowledgement is received, the initiator NIC then sends one or more data packets to the responder node over the dynamic connection in order to fulfill the work request.

In an embodiment, the IB DC transport service allows an initiator NIC to establish concurrent connections with multiple DCT process endpoints. For example, in an embodiment, an initiator process executing on an initiator node submits one or more work requests to the initiator NIC to send one or more messages to a first target process, a second target process, and a third target process. The initiator NIC establishes the connections with the target processes and transmits messages to the multiple endpoints until the messages have all been sent, unless a connection error occurs and interrupts the messaging process.

In an embodiment, if a fault occurs that interrupts any one of multiple connections from the initiator NIC to any one of the target processes, the result is an error that disconnects the initiator NIC from all of the target processes. In an embodiment, the initiator NIC identifies which target process is unreachable and caused the fault, and which remaining target processes are reachable. In an embodiment, the initiator NIC reconnects with the reachable target processes and polls them for message-completion acknowledgment messages. The NIC then compares the acknowledgement messages to messages queued for sending and removes the content of any message that corresponds to an acknowledgment message because it means the message has already successfully been sent and re-sending the message is undesirable. The NIC then sends the remaining queued messages.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
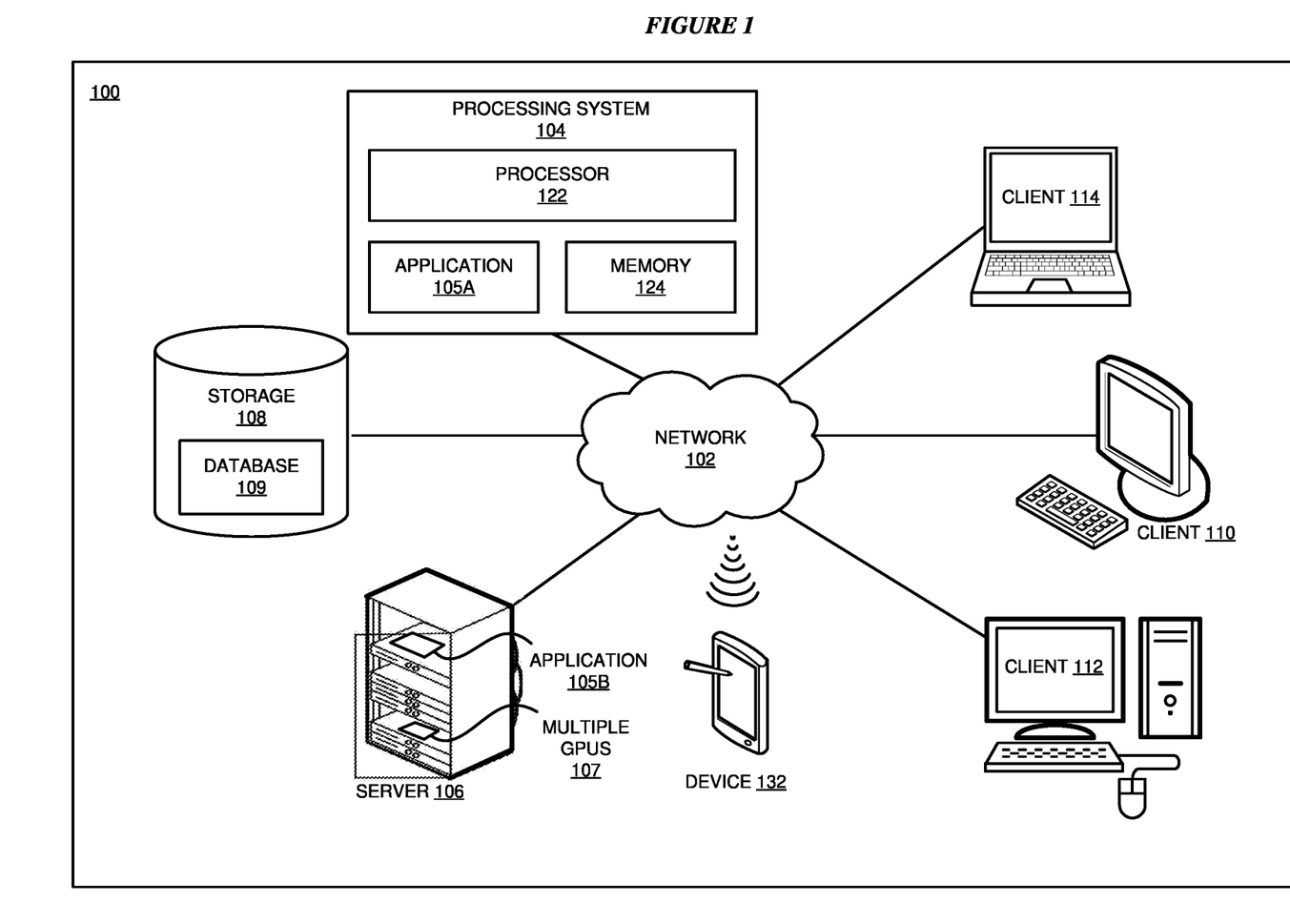
FIG. 1 depicts a block diagram of a network of data processing systems in which illustrative embodiments may be implemented.
Figure 2:
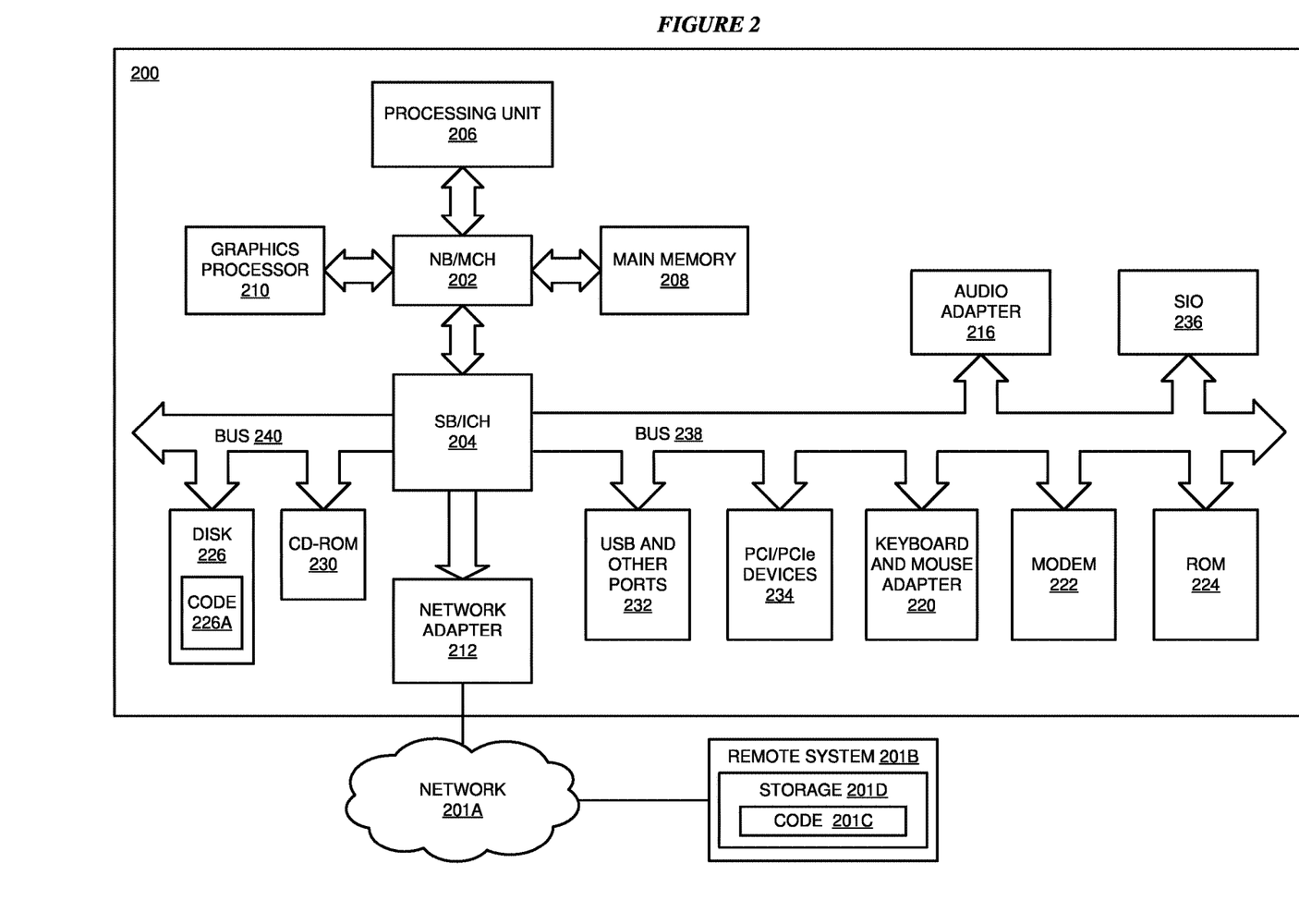
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
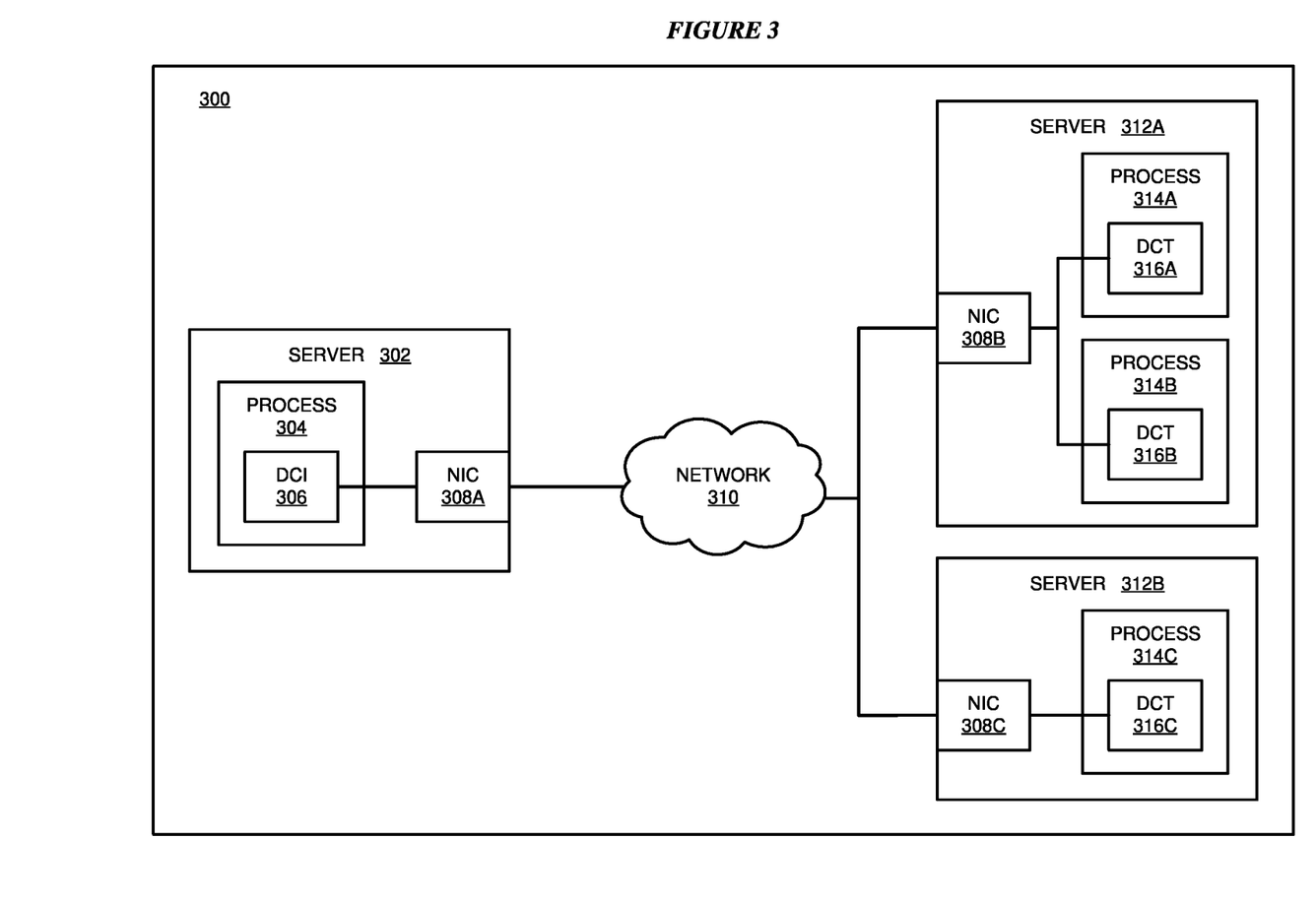
FIG. 3 depicts a block diagram of an example network configuration in accordance with an illustrative embodiment.

With reference to FIG. 3, this figure depicts a block diagram of an example network configuration 300 in accordance with an illustrative embodiment. The example embodiment includes a plurality of networked computing nodes 302, 312A, and 312B. In a particular embodiment, nodes 302, 312A, and 312B are examples of processing system 104, server 106, device 132, or clients 110, 112, and 114 of FIG. 1.

In the illustrated embodiment, the network configuration 300 supports an IB dynamically-connected (DC) transport service amongst nodes 302, 312A, and 312B. The nodes 302, 312A, and 312B are interconnected by a network 310, for example a packet network, such as an IB switch fabric. In the illustrated embodiment, node 302 is a server that acts as an initiator node, while nodes 312A and 312B are servers that act as responder nodes. However, in an embodiment, any of nodes 302, 312A, and 312B act as an initiator, a responder, or both concurrently at various times.

In the illustrated embodiment, an initiator process 304 is executing on an initiator node 302 operating as a server that constructs a communications stack and connects to the network 310 via a NIC 308A (such as an IB Host Channel Adapter (HCA). In an embodiment, node 302 is a computing device or networked peripheral device. In the illustrated embodiment, the NIC 308A receives a work request from an initiator process 304 that includes a DC initiator (DCI) module 306. The DCI module 306 generates the work request and transmits it to the NIC 308A with instructions to send a message to a target process 314A executing on a responder node 312A. In the illustrated embodiment, responsive to receiving the work request, the NIC 308A of the initiator node 302 sends a "DC Connect" packet to the NIC 308B of the responder node 312A in an attempt to establish a dynamic connection. In an embodiment, after sending the DC connect packet, NIC 308A waits to receive an acknowledgment from the responder NIC 308B, and, if the acknowledgement is received, the NIC 308A then sends one or more data packets to the responder node 312A over the dynamic connection in order to fulfill the work request.

In an embodiment, at the responder node 312A, the NIC 308B receives the DC connect packet and replies by sending one or more acknowledgement packets to the initiator NIC 308A, which in turn triggers the NIC 308A to respond with message data packets. The NIC 308B directs the packets from NIC 308A to a process on the responder node 312A as indicated by the packets, for example process 314A. The process 314A includes a DC Target (DCT) module 316A for handling receipt and acknowledgment of the packets from the initiator process 304. Once all the work requests on the initiator NIC 308A relating to this target process have been executed, the NIC 308A and on the initiator node 302 and the NIC 308B on the responder node 312A tear down the dynamic connection between the initiator process 304 and the target process 314A, and the DC context on the initiator NIC 308A becomes available to connect with other processes.

In an embodiment, the IB DC transport service allows the NIC 308A to dynamically establish connections with multiple DCT process endpoints. For example, in an embodiment, the initiator process 304 executing on initiator node 302 submits one or more work requests to NIC 308A to send one or more messages to a first target process 314A and DCT module 316A on responder node 312A, a second target process 314B and DCT module 316B on responder node 312A, and a third target process 314C and DCT module 316C on responder node 312B. The NIC 308A dynamically establishes the connections and transmits messages to each of the multiple endpoints in turn as the messages are processed until the messages have all been sent, unless a connection error occurs and interrupts the messaging process.

If a fault occurs that interrupts a connection from the NIC 308A to any one of the target processes 314A, 314B, or 314C, the result is an error that disconnects the NIC 308A from the connected one of the target processes 314A, 314B, and 314C. In an embodiment, as described in greater detail below, the NIC 308A identifies which target process is unreachable and caused the fault, and which remaining target processes are reachable. The NIC 308A reconnects with the reachable target processes each in turn, and polls them for message-completion acknowledgment messages. The NIC 308A compares the acknowledgement messages to messages queued for sending and removes the content of any message that corresponds to an acknowledgment message because it means the message has already successfully been sent and re-sending the message is undesirable. The NIC 308A then sends the remaining queued messages.

Figure 4:
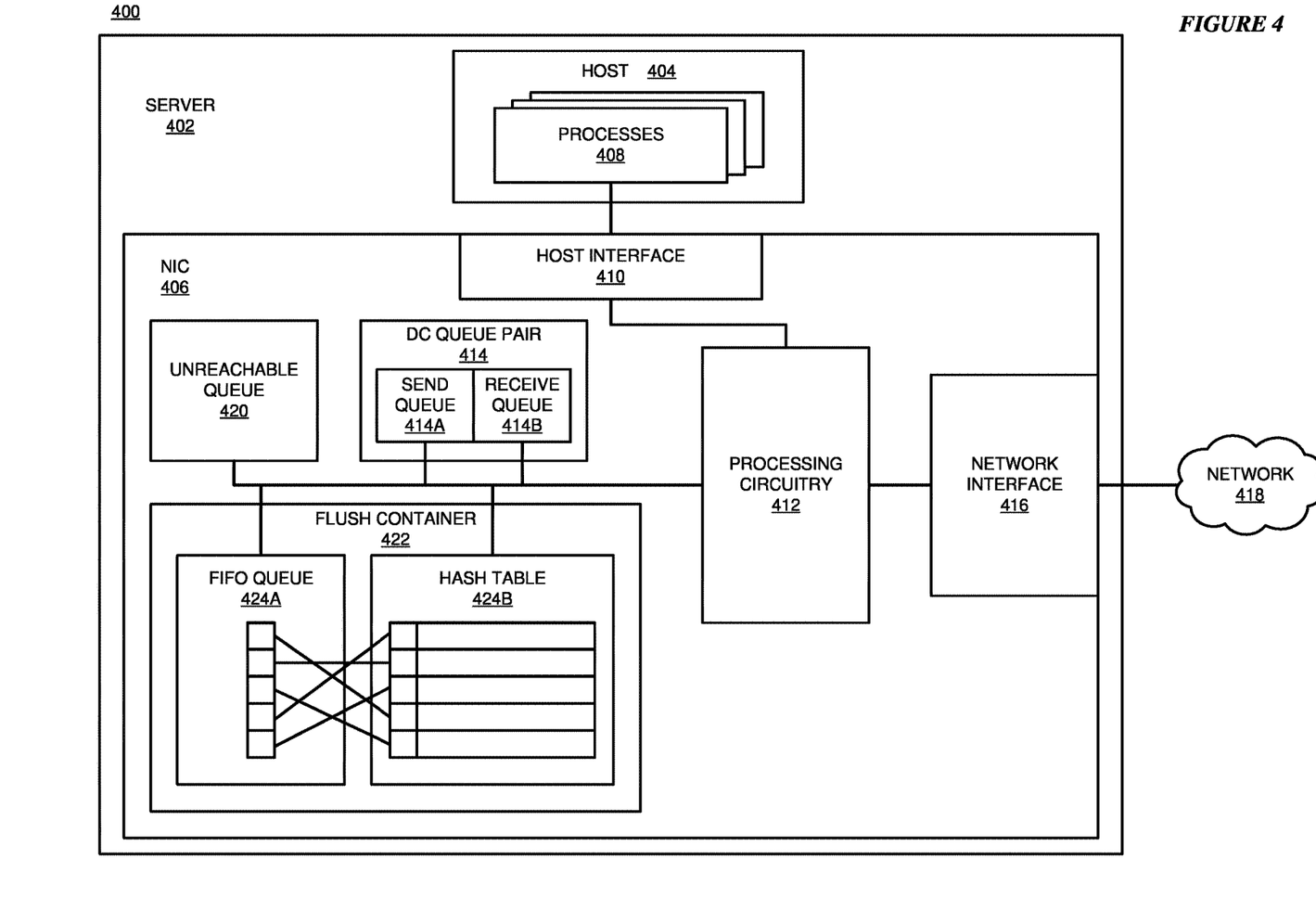
FIG. 4 depicts a block diagram of an example network configuration in accordance with an illustrative embodiment.

With reference to FIG. 4, this figure depicts a block diagram of an example network configuration 400 in accordance with an illustrative embodiment. The example embodiment includes a server as computing node 402 connected to a network 418. Node 402 is described as an example of initiator node 302 of FIG. 3, but is also suitable for operating as a responder node, such as responder nodes 312A and 312B of FIG. 3.

In the illustrated embodiment, the node 402 includes a processing host 404 that runs one or more processes 408. In the illustrated embodiment, the NIC 406 comprises a host interface 410 for communicating with host 404 and a network interface 416 for transmitting and receiving packets to and from network 418. In an embodiment, NIC 406 receives a work request, such as a remote direct memory access (RDMA) request, and a communication stack for network communications from process 408 via host interface 410. In an embodiment, the NIC 406 executes the work request by transmitting one or more messages containing data packets from the process 408 to network 418 and destined for one or more responder nodes (for example responder nodes 312A and 312B).

In the illustrated embodiment, the NIC 406 includes processing circuitry 412. In an embodiment, the processing circuitry 412 includes circuitry for reading and executing software instructions for tasks described herein as being performed by the processing circuitry 412, where the software instructions are stored in memory included in the processing circuitry 412 and/or memory anywhere external to the processing circuitry 412 that is accessible and accessed by the processing circuitry 412. In an embodiment, the processing circuitry 412 controls operations of the NIC 406 described herein. For example, in an embodiment, the processing circuitry 412 controls the receiving and queuing of outgoing messages in a DC queue pair 414, which includes a send queue 414A and a receive queue 414B. The processing circuitry 412 stores outgoing messages from the process 408 in the send queue 414A, where the messages are stored and maintained in an order in which they are meant to be sent.

When the NIC 406 prepares to send a message from the send queue 414A to a responder node, the NIC 406 uses IB queue pair verbs (or just "IB verbs") to establish a channel between the nodes. IB verbs are abstract representations of functions defined by the software interface to IB that are available for use in applications that exchange data using an IB network. The channel associates the queue pairs of the two nodes, with the send queue of each node being associated with the receive queue of the other node. The processing circuitry 412 initiates transmission of each messages from the send queue 414A via network interface 416 to a responder node. The processing circuitry 412 then monitors incoming messages to the NIC 406, specifically to the receive queue 414B, for an acknowledgement message from the responder node confirming receipt of the message. When the receive queue 414B receives the acknowledgement message, the processing circuitry initiates transmission of the next message in the send queue 414A if there is a message remaining to be sent.

In an embodiment, the IB DC transport service used by the node 402 allows the DC queue pair 414 from the NIC 406 to establish concurrent connections with multiple DCT processes. If a fault occurs that interrupts any one of the connections from the queue pair 414 to any one of the DCT processes (e.g., processes 314A, 314B, or 314C), the result is an error that disconnects the current connection and the QP moves to an error state.

In an embodiment, the processing circuitry 412 detects the error and, responsive to the error, performs an error state message management process that includes determining if any remaining messages are intended for reachable target processes, re-establishing queue-pair connections with the reachable target processes, polling the re-connected target processes for message acknowledgement events, and removing the message content of any queued messages that correspond to any detected message acknowledgements before any of the queued messages are sent. A connection fault can occur at any time, including moments between when a target process has received a message, but before the target process has sent an acknowledgement, which results in the message remaining in the send queue 414A of the initiator NIC 406, even though it was already received by the target process. In some embodiments, if processing circuitry 412 does not detect and remove the message that was already received by the target process, the NIC 406 will send the message again, which will be a duplicate message at the target queue and potentially cause a myriad of errors.

Thus, in an embodiment, the processing circuitry 412 performs the error state message management process upon detection of a connection error to prevent the sending of such duplicate messages. In an embodiment, the processing circuitry 412 performs the error state message management process according to software instructions stored in memory in the processing circuitry 412 and/or anywhere accessible by the processing circuitry 412. The process determines which target process caused the error and moves any messages intended for the offending target process into an unreachable queue. The process includes electronically storing messages in a computer memory or the like that are intended for the remaining target processes in a flush container 422 with two data structures: A FIFO queue 424A to store a list of message identifiers, and a hash table 424B to store the message data, indexed by the message identifiers. Once processing circuitry 412 has processed all the failed messages, the communications stack will re-establish the DC queue-pair connection with endpoints that remain reachable. The communications stack will poll the IB completion queue(s) of the newly re-established DC queue-pair(s) for completion status events. The poll takes place before any new messages are posted on the queue-pair. If any completion status events are found, the communications stack will read the message identifier from the event and delete the corresponding message data from the hash table portion of the Flush container. The hash table indexed by message identifier allows this to be done quickly to reduce overall message latency. To further reduce processing time, the corresponding message identifier is not removed from the FIFO portion of the Flush container at this time. The communications stack will access the FIFO queue 424A of the Flush container 422, and will begin popping the message identifiers entries from the top of the FIFO (thus removing them). It will then access the corresponding message data from the hash table and re-post the message to its original destination. The message data will then be removed from the hash table. Using the FIFO queue for message identifiers forces the messages to be sent in the same order as they were originally intended to be sent, without duplicate messages.

Figure 5:
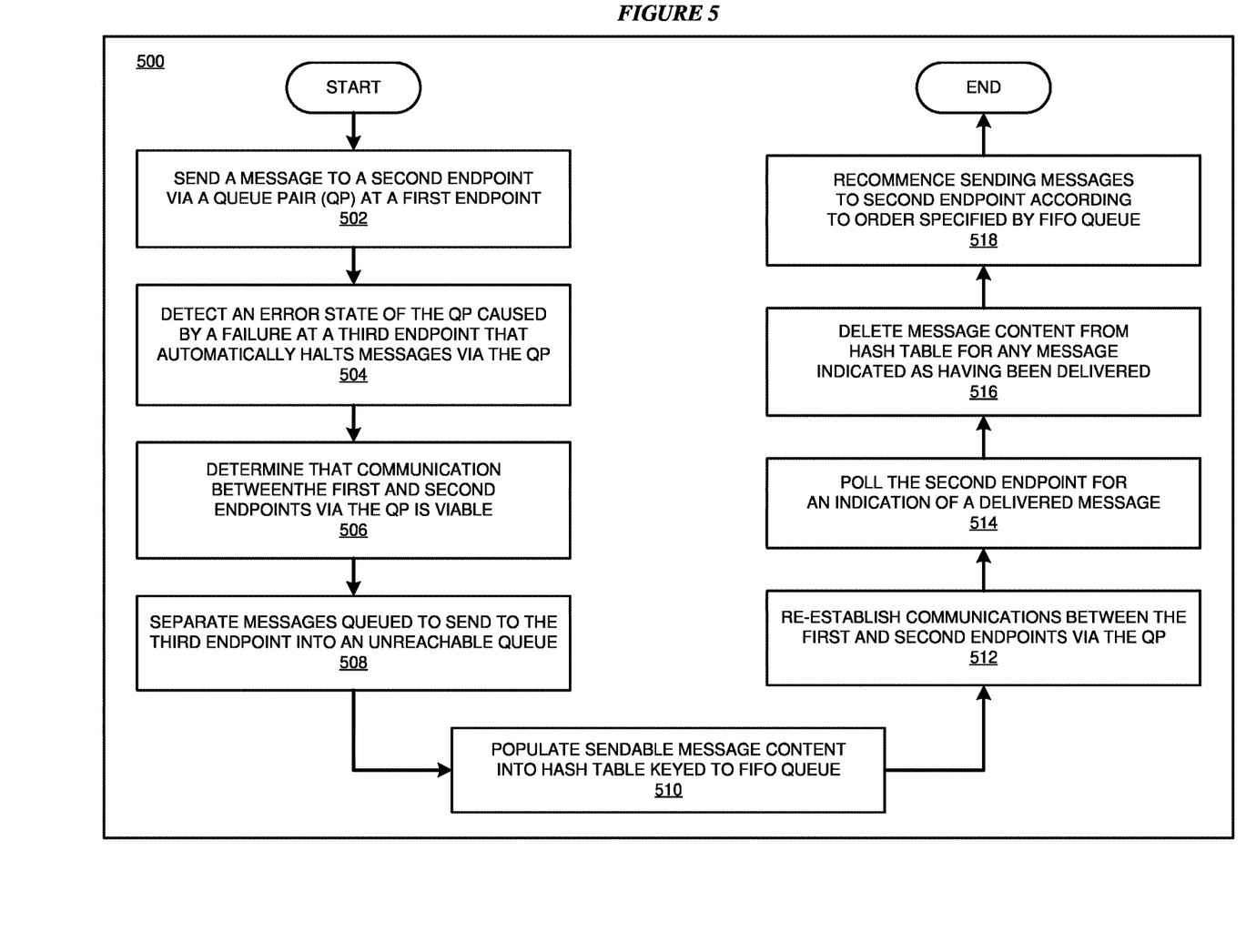
FIG. 5 depicts a flowchart of an example process for an error state message management process in accordance with an illustrative embodiment.

With reference to FIG. 5 this figure depicts a flowchart of an example process 500 for an error state message management process in accordance with an illustrative embodiment. In a particular embodiment, the NIC 406 carries out the process 500.

In an embodiment, at block 502, a NIC at an initiator node hosting an initiator process sends a message to a target process executing on a responder node. In an embodiment, the initiator process constitutes an example of a first endpoint, and the target process constitutes an example of a second endpoint. In an embodiment, the NIC sends the message via a QP. Next, at block 504, the NIC detects an error state of the QP caused by a failure at a third endpoint. In an embodiment, the error is caused by a connection failure between the first and third endpoints. In an embodiment, the error state automatically halts all messages via the QP.

Next, at block 506, the NIC determines that communication between the first and second endpoints via the QP is viable. For example, in an embodiment, the NIC analyses the error message and determines that the error is because of the connection between the first and the third endpoints and deduces that the remaining connections that did not cause an error are still viable connections. Next, at block 508, the NIC separates messages queued to send to the third endpoint into a separate queue for messages intended for an unreachable node, or an "unreachable queue." Next, at block 510, the NIC populates sendable message content (i.e., messages intended for a target process via a viable connection) into a hash table keyed to a FIFO queue. In an embodiment, the NIC detects a unique identifier assigned to each message, for example by a communication stack at a host or host process, and the identifiers are listed in the FIFO table. The unique identifiers are also used as key values in the hash table along with corresponding message content, which is also stored in the hash table.

Next, at block 512, the communication stack re-establishes communications between the first and second endpoints via the QP. Next, at block 514, the NIC polls the second endpoint for indications of one or more delivered messages, for example message acknowledgement messages. Next, at block 516, the NIC deletes messages from the hash table that correspond to messages found in the message acknowledgements at the second endpoint. Next, at block 518, the NIC begins sending messages in the second queue to the second endpoint in order according to the FIFO list. In an embodiment, the NIC selects a message to send based on the order of messages in the FIFO list, then fetches message content from the hash table that is keyed to the value in the FIFO list.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
sending, via a queue pair (QP) at a first endpoint, a message to a second endpoint, wherein the first endpoint is associated with an initiator process running on a first node on a network and the second endpoint is associated with a responder process running on a second node on the network;
detecting an error state of the QP caused by a failure at a third endpoint, the error state causing the QP to automatically halt sending messages to the second and third endpoints;
determining that communication between the first and second endpoints is available via the QP;
separating a first queued message that is queued to send to the third endpoint into a first queue and a second queued message that is queued to send to the second endpoint into a second queue,
wherein the second queue comprises a list of key values and a table that includes the key values and associated message contents, wherein the list of key values comprises a first-in first-out (FIFO) list, and wherein the table that includes the key values and associated messages comprises a hash table;
re-establishing communications between the first and second endpoints via the QP;
polling, responsive to the re-establishing of the communications, the second endpoint for an indication of a delivered message;
deleting message content associated with the delivered message from the hash table; and
recommencing sending messages in the second queue to the second endpoint in order according to the first-in first-out (FIFO) FIFO list.

2. The computer implemented method of claim 1, wherein the detecting of the error state is based at least in part on passage of a predetermined amount of time if the acknowledgment does not come back.

3. The computer implemented method of claim 1, wherein the determining that communication between the first and second endpoints via the QP is viable is based at least in part on the error state being unrelated to communications between the first and second endpoints via the QP.

4. The computer implemented method of claim 1, further comprising: running, on a first server, a first process hosting the first endpoint and the QP.

5. The computer implemented method of claim 1, wherein the sending, via the QP, of the message is to a process running on a second server hosting the second endpoint.

6. The computer implemented method of claim 1, wherein the error state automatically halts messages between the first and second endpoints via the QP.

7. The computer implemented method of claim 1, further comprising: responsive to detecting the error state, assigning a flush status to messages queued to send via the QP.

8. The computer implemented method of claim 1, wherein the first queue is a queue for messages intended to be sent to an unreachable endpoint and the second queue is for messages intended to be sent to a reachable endpoint.

9. The computer implemented method of claim 1, wherein the polling of the second endpoint is completed prior to the recommencing of sending messages.

10. The computer implemented method of claim 9, wherein the deleting of the message content is completed prior to the recommencing of sending messages.

11. A computer program product for error state message management, the computer program product comprising one or more computer readable storage media, and program instructions collectively stored on the one or more computer readable storage media, the program instructions executable by controller circuitry to cause the controller circuitry to perform operations comprising:
   sending, via a queue pair (QP) at a first endpoint, a message to a second endpoint, wherein the first endpoint is associated with an initiator process running on a first node on a network and the second endpoint is associated with a responder process running on a second node on the network;
   detecting an error state of the QP caused by a failure at a third endpoint, the error state causing the QP to automatically halt sending messages to the second and third endpoints;
   determining that communication between the first and second endpoints is available via the QP;
   separating a first queued message that is queued to send to the third endpoint into a first queue and a second queued message that is queued to send to the second endpoint into a second queue,
   wherein the second queue comprises a list of key values and a table that includes the key values and associated message contents, wherein the list of key values comprises a first-in first-out (FIFO) list, and wherein the table that includes the key values and associated messages comprises a hash table;
   re-establishing communications between the first and second endpoints via the QP;
   polling, responsive to the re-establishing of the communications, the second endpoint for an indication of a delivered message;
   deleting message content associated with the delivered message from the hash table; and
   recommencing sending messages in the second queue to the second endpoint in order according to the FIFO list.

12. The computer usable program product of claim 11, wherein the stored program instructions are stored in a computer readable storage device in a data processing system, and wherein the stored program instructions are transferred over a network from a remote data processing system.

13. The computer usable program product of claim 11, wherein the stored program instructions are stored in a computer readable storage device in a server data processing system, and wherein the stored program instructions are downloaded over a network to a remote data processing system for use in a computer readable storage device associated with the remote data processing system, further comprising: program instructions to meter use of the computer usable code associated with the request; and program instructions to generate an invoice based on the metered use.

14. A computer system comprising a processor and one or more computer readable storage media, and program instructions collectively stored on the one or more computer readable storage media, the program instructions executable by the processor to cause the processor to perform operations comprising:
   sending, via a queue pair (QP) at a first endpoint, a message to a second endpoint, wherein the first endpoint is associated with an initiator process running on a first node on a network and the second endpoint is associated with a responder process running on a second node on the network;
   detecting an error state of the QP caused by a failure at a third endpoint, the error state causing the QP to automatically halt sending messages to the second and third endpoints;
   determining that communication between the first and second endpoints is available via the QP;
   separating a first queued message that is queued to send to the third endpoint into a first queue and a second queued message that is queued to send to the second endpoint into a second queue,
   wherein the second queue comprises a list of key values and a table that includes the key values and associated message contents, wherein the list of key values comprises a first-in first-out (FIFO) list, and wherein the table that includes the key values and associated messages comprises a hash table;
   re-establishing communications between the first and second endpoints via the QP;
   polling, responsive to the re-establishing of the communications, the second endpoint for an indication of a delivered message;
   deleting message content associated with the delivered message from the hash table; and
   recommencing sending messages in the second queue to the second endpoint in order according to the FIFO list.

* * * * *